March 18, 1969   R. G. TOMLINSON   3,433,555

OPTICAL FUSE

Filed March 4, 1965

INVENTOR.
RICHARD G. TOMLINSON
BY
Anthony D. Cennamo

United States Patent Office 3,433,555
Patented Mar. 18, 1969

3,433,555
OPTICAL FUSE
Richard G. Tomlinson, Columbus, Ohio, assignor to The Ohio State University Research Foundation
Filed Mar. 4, 1965, Ser. No. 437,106
U.S. Cl. 350—160
Int. Cl. H01s 3/10; G02f 1/28
4 Claims

ABSTRACT OF THE DISCLOSURE

This invention relates to the regulation and control of the power output of a laser beam and specifically an optical switch is accomplished by abruptly terminating the beam when a selected power is reached. The breakdown occurs when the laser beam is brought to a focus in a variable pressure gas chamber. A recollimating lens permits the beam to pass through the chamber unattenuated in the absence of a breakdown.

BACKGROUND

The high power output coupled wtih good spatial coherence available from solid state lasers has resulted in sources of unprecedented photometric brightness (power density/unit solid angle) at optical and near optical wavelengths. High brightness laser beams can be sharply focused to produce enormous power densities which have never previously existed for radiant energy. Each succeeding development in laser technology which has increased the brightness of laser sources has allowed the observation of more and more non-linear effects produced by the laser beam in solids, liquids, and gases. An increasing number of effects which had been only matters for academic speculation have become a present reality and have suddenly made the field of non-linear optics one of contemporary engineering as well as scientific interest.

Approximate regulation of the amplitude of the pulse emitted by a high brightness laser such as a Q-switched, ruby laser has usually been achieved through the control of the pumping energy and the cavity configuration. This type of secondary control cannot, of course, prevent randomness in the laser pulse amplitude due to such factors as temperature changes in the laser crystal and changing modes of oscillation under various pumping conditions.

SUMMARY OF INVENTION

A non-linear interaction now possible, with the present invention, between a laser beam and a gas is the ionization and electrical "breakdown" produced when the light from a high brightness laser is brought to a focus in a gas chamber. That is the optical switch of the present invention operates directly on the laser beam by abruptly terminating the beam when a selected power is reached. In this way laser-induced gas discharges uniquely permit the reliable and repeatable selection of the desired peak power in a laser pulse over a wide variation in the parameters of the laser system.

OBJECTS

It is accordingly a primary object of the present invention to provide a method and means of regulating and controlling a laser beam.

It is a further object of the invention to provide a method and means of inducing a laser gas discharge for the selection of peak power in a laser pulse.

A further object of the invention is to provide a correlation between gases and their discharge with a laser beam.

Other objects and features of the present invention will become apparent from the following detailed description when taken in conjunction with the drawings in which:

DETAILED DESCIPTION OF DRAWINGS

Figure 1:
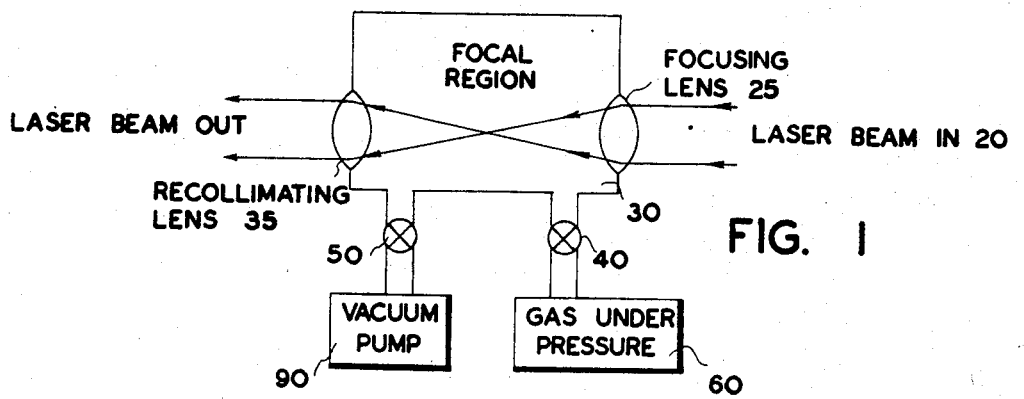
FIGURE 1 is a schematic diagram of a preferred embodiment of the system of the present invention.

In accordance with the general concepts of the invention, the laser beam is brought to a focus by a first lens and recollimated by a second lens in an enclosed gaseous environment. A high power density is created at the focal region of the beam. For each particular case of gas composition and pressure there exists a breakdown threshold. If the maximum power density at the focal region is below this threshold value, the laser pulse passes through the system with negligible attenuation or degradation of its spatial coherence. When the power density exceeds this threshold value, the gas in the focal region breaks down and a dense, turbulent plasma and shock wave are generated which severely attenuate any further laser energy entering the system until recombination and diffusion have dissipated the plasma. The phenomena of the optical fuse is that there is generated an electrical breakdown when a laser beam of high photometric brightness (power density/unit solid angle) produces high power densities in the working substance. A schematic diagram of the preferred arrangement in demonstrating the optical fuse of the present invention is shown in FIGURE 1. The laser beams originating from a laser source 20 is illustrated as entering and leaving a gaseous breakdown chamber 30. The laser beam is brought to a focus in the chamber 30 by the lens 25. This lens creates a high power density of the laser beam at the focal region. At the opposite end of chamber 30 is recollimating lens 35. This lens permits the laser beam to pass unaffected when no breakdown occurs.

The breakdown chamber 30 is, in this embodiment, made of a brass housing with a pair of windows for viewing the discharge on gas breakdown. The chamber 30 is evacuated by pressure pump 90 through valve 50. A source of gas (or liquid) is provided by reservoir 60 and valve 40 for the chamber 30.

Figure 2:
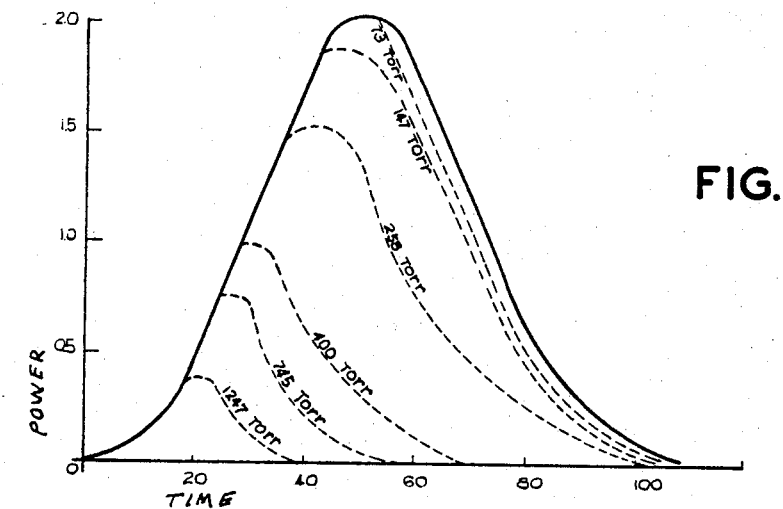
FIGURE 2 is a power vs. time graph of a transmitted laser pulse in a gas as a function of pressure.

With a constructed embodiment of the arrangement shown in FIGURE 1, data was taken to determine the characteristics of laser-induced gas breakdown as a function of gas pressure, gas composition, focusing lens, and laser power. The presence of breakdown was determined by the observation of a visible discharge in the focal region of the laser beam in the enclosed chamber. FIGURE 2 illustrates graphically the laser pulses transmitted through the optical switch as a function of gas pressure. The data was taken with argon gas in the chamber, a 3 cm. focal length focusing lens, and a constant incident laser pulse. The shape of the incident pulse with a fixed amplitude of 2 megawatts is shown by the solid curved line. The dashed curved lines illustrate the transmitted pulse for each given pressure of gas. For the higher pressures—and at a fixed pressure—the peak output laser power is fairly constant over a wide variation in the peak incident laser power. It is seen, therefore, that the gas breakdown occurs at power levels determined by the gas pressure; that is, the laser beam passing through the gas chamber is terminated at chosen power levels by selection of the proper gas pressure. As the pressure was lowered, a higher power density was required to produce breakdown. With the parameters utilized in this arrangement, gas pressures below 62 torr did not cause breakdown and the incident pulse was transmitted with negligible attenuation.

Figure 3:
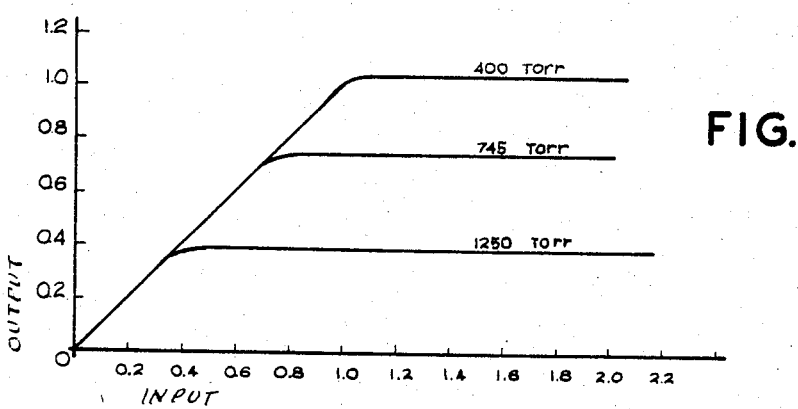
FIGURE 3 is a graphical illustration of the optical fuse of the present invention as a peak power selector.

The operation of the optical fuse as a peak power selector is illustrated in FIGURE 3. From this graph it is apparent that the peak power transmitted is held constant over a wide variation in the peak laser power incident. Near the threshold power levels (marked in FIGURE 3) no power limiting effect is seen even though a visible gas discharge was produced. This is believed to be a result of breakdown occurring late in the pulse after the peak of the incident pulse passed through the switch unattenuated.

For low pressures, the peak power transmitted is not independent of the peak power incident since the rate of energy transfer from the laser pulse to the plasma is a function of the neutral particle density of the gas. At low pressures, this rate is so slow that the plasma growth time is not longer fast compared to the long time variation of the laser pulse intensity. Lenses having a shorter focal length for focusing the beam would result in higher power densities at the focal region for the same incident laser power, and hence in breakdown at lower power levels.

The flatness of the laser pulse over a wide range of powers of the curves relating the peak incident and transmitted pulse, for conditions not near the pressure or power thresholds, makes the optical fuse useful as a peak pulse power limiter. The dependence on pressure of the power level at which this flatness occurs indicates that the laser power can be adjusted through an easily controlled parameter, gas pressure.

Further, the optical fuse of the present invention has the advantages of being passive, lossless prior to breakdown, and can be designed to produce little degradation of the spatial coherence of the laser beam passing through it. This allows it to be incorporated inside the laser cavity where it can act as a self-repairing optical fuse protecting laser components from damaging power density levels by pre-setting the gas pressure and terminating the lasing action. Finally, the sharply attenuated pulse after breakdown lends itself to pulse shaping.

Although certain and specific embodiments and illustrations are given, modifications and departures may be had without departing from the true spirit and scope of the invention.

What is claimed is:
1. Apparatus for the control of an optical beam comprising, a chamber, a source of gas, pressure means connecting said source to said chamber, lens means positioned at one end of said chamber and in the path of said optical beam to create a high power density of said optical beam at the focal region in said chamber, means for varying the pressure of said gas in said chamber for terminating said optical beam; and wherein said chamber further comprises a recollimating lens positioned opposite said first lens to permit said optical beam to pass through said chamber unattenuated in the absence of breakdown of said beam in said chamber.

2. Apparatus as set forth in claim 1 wherein said chamber further includes evacuating means.

3. Apparatus as set forth in claim 1 wherein said optical termination is a function of gas pressure, gas composition, focusing lens, and optical beam power, and wherein said termination occurs at the breakdown threshold of said gas.

4. Apparatus utilizing a layer pulse comprising, a chamber, means for evacuating said chamber, a gas source, pressure means for introducing gas from said source into said chamber; a first lens for directing said laser pulse into said chamber and for creating a high power density of said laser pulse at its focal region; means for varying said pressure of said gas and for correlating said gas pressure with the composition of said gas, said first lens and the power of said laser beam for exceeding the breakdown threshold of said gas; and wherein said chamber further comprises a recollimating lens positioned opposite said first lens to permit said optical beam to pass through said chamber unattenuated in the absence of breakdown of said beam in said chamber.

References Cited
UNITED STATES PATENTS 3,289,099   11/1966   Masters _____ 331—94.5

JEWELL H. PEDERSEN, *Primary Examiner.*

WILLIAM L. SIKES, *Assistant Examiner.*

U.S. Cl. X.R.

331—94.5